United States Patent
Desmarais et al.

(10) Patent No.: US 10,706,455 B2
(45) Date of Patent: Jul. 7, 2020

(54) INDIRECT AND DIRECT DELIVERY OF APPLICATIONS

(71) Applicant: APPDIRECT, Inc., San Francisco, CA (US)

(72) Inventors: Nicolas Desmarais, San Francisco, CA (US); Anindya Sen, Union City, CA (US); Christophe Levesque, Sunnyvale, CA (US); Mary Becica, San Francisco, CA (US); Fivos Constantinou, San Francisco, CA (US); Daniel Saks, San Francisco, CA (US)

(73) Assignee: AppDirect, Inc., San Francisco, CA (US)

( * ) Notice: Subject to any disclaimer, the term of this patent is extended or adjusted under 35 U.S.C. 154(b) by 240 days.

(21) Appl. No.: 15/865,772

(22) Filed: Jan. 9, 2018

(65) Prior Publication Data

US 2018/0158131 A1    Jun. 7, 2018

Related U.S. Application Data

(63) Continuation of application No. 14/202,993, filed on Mar. 10, 2014, now Pat. No. 9,886,712.

(60) Provisional application No. 61/780,084, filed on Mar. 13, 2013.

(51) Int. Cl.
*G06Q 30/06* (2012.01)

(52) U.S. Cl.
CPC ................ *G06Q 30/0633* (2013.01)

(58) Field of Classification Search
CPC .... G06Q 30/00; G06Q 30/06; G06Q 30/0633; H04L 9/32

USPC .......................... 705/26.8, 27.2, 27
See application file for complete search history.

(56) References Cited

U.S. PATENT DOCUMENTS

| | | | |
|---|---|---|---|
| 6,697,824 B1 * | 2/2004 | Bowman-Amuah | ........................ G06F 16/958 709/229 |
| 8,200,527 B1 | 6/2012 | Thompson et al. | |
| 9,117,229 B2 | 8/2015 | Setton | |
| 9,123,063 B2 | 9/2015 | Setton | |
| 9,886,712 B2 | 2/2018 | Desmarais et al. | |
| 2001/0013064 A1 * | 8/2001 | Cox | ........................ G06F 8/61 709/220 |

(Continued)

OTHER PUBLICATIONS

"U.S. Appl. No. 14/202,993, Non Final Office Action dated Jan. 5, 2017", 13 pgs.

(Continued)

*Primary Examiner* — Oluseye Iwarere
(74) *Attorney, Agent, or Firm* — McDermott Will & Emery LLP

(57) ABSTRACT

A system comprising marketplaces, developer sites and a marketplace platform is described. The marketplaces allow companies to purchase many applications from many sources, including the developer application. The developer site provides the developer application and allows companies to purchase the developer application. The marketplace platform provides a single application programmer interface (API) for companies to license the developer application through both the marketplaces and the developer site. The platform also provides for managing user entitlements the developer application for both the plurality of marketplaces and the developer site.

20 Claims, 11 Drawing Sheets

(56) References Cited

U.S. PATENT DOCUMENTS

| | | | |
|---|---|---|---|
| 2002/0107809 A1* | 8/2002 | Biddle | G06Q 10/10 705/59 |
| 2003/0032406 A1* | 2/2003 | Minear | G06F 21/10 455/410 |
| 2004/0064351 A1* | 4/2004 | Mikurak | G06Q 10/087 705/22 |
| 2007/0038567 A1* | 2/2007 | Allaire | G06Q 30/0239 705/50 |
| 2007/0245013 A1 | 10/2007 | Saraswathy et al. | |
| 2008/0228513 A1* | 9/2008 | McMillan | G06F 21/105 705/1.1 |
| 2009/0037287 A1* | 2/2009 | Baitalmal | G06F 21/128 705/27.1 |
| 2009/0112734 A1 | 4/2009 | Viehmann et al. | |
| 2009/0112735 A1 | 4/2009 | Viehmann et al. | |
| 2009/0182565 A1 | 7/2009 | Erickson et al. | |
| 2009/0222322 A1 | 9/2009 | Andersen et al. | |
| 2011/0213691 A1 | 9/2011 | Ferris et al. | |
| 2011/0251921 A1 | 10/2011 | Kassaei et al. | |
| 2012/0059700 A1 | 3/2012 | Darbyshire | |
| 2012/0089410 A1* | 4/2012 | Mikurak | G06Q 10/00 705/1.1 |
| 2012/0191567 A1* | 7/2012 | Williams | G06Q 20/0855 705/26.8 |
| 2012/0303490 A1* | 11/2012 | Hill | G06Q 30/00 705/27.2 |
| 2012/0303491 A1* | 11/2012 | Hill | G06Q 30/06 705/27.2 |
| 2013/0110726 A1* | 5/2013 | Pereira | G06F 21/105 705/59 |
| 2013/0144755 A1 | 6/2013 | Mowatt et al. | |
| 2013/0198733 A1 | 8/2013 | Farrell et al. | |
| 2013/0325573 A1 | 12/2013 | Park et al. | |
| 2014/0032350 A1* | 1/2014 | Biswas | G06F 21/125 705/26.3 |
| 2014/0236846 A1* | 8/2014 | Melika | G06Q 50/184 705/310 |
| 2014/0279216 A1* | 9/2014 | Desmarais | G06Q 30/0633 705/26.8 |
| 2014/0337148 A1 | 11/2014 | Kannan et al. | |
| 2014/0358695 A1 | 12/2014 | Setton | |
| 2014/0358700 A1 | 12/2014 | Setton | |
| 2014/0359745 A1 | 12/2014 | Setton et al. | |
| 2016/0098760 A1 | 4/2016 | Keller et al. | |

OTHER PUBLICATIONS

"U.S. Appl. No. 14/202,993, Notice of Allowance dated Sep. 27, 2017", 10 pgs.

"U.S. Appl. No. 14/202,993, Notice of Non-Compliant Amendment dated Nov. 1, 2016", 3 pgs.

"U.S. Appl. No. 14/202,993, Response filed Jul. 5, 2017 to Non Final Office Action dated Jan. 5, 2017", 28 pgs.

"U.S. Appl. No. 14/202,990, Response filed Oct. 26, 2016 to Restriction Requirement dated Jul. 26, 2016", 8 pgs.

"U.S. Appl. No. 14/202,993, Response filed Dec. 9, 2016 to Restriciton Requirement dated Jul. 26, 2016", 9 pgs.

"U.S. Appl. No. 14/202,993, Restriction Requirement dated Jul. 26, 2016", 6 pgs.

U.S. Appl. No. 14/202,993 U.S. Pat. No. 9,886,712, filed Mar. 10, 2014, Indirect and Direct Delivery of Applications.

\* cited by examiner

Edit Integration

Single Sign-On

Login URL:

Open ID Realm:

Subscriptions

Create URL:

[ ] This is an interactive endpoint   [ ] Customers must register a domain when ordering Additional subscription endpoints 820
(e.g. change, cancel, status)

Add-ons

Add-on URL:

Additional add-on endpoints 822
(e.g. change, cancel)

Access Management

Assign URL:

Unassign URL:

User Information to Sync:
[ ] Job Title [ ] Department [ ] ZIP Code [ ] Billing Rate [ ] Time Zone [ ] Application Administrator
Status [ ] View/Edit Rights [ ] Username [ ] Identification Number [ ] Group (Primary) [ ] All Groups OAuth Configuration Key: test-product-key-1234  Secret: abcdGWvW70E8ERH   New Secret 824

Save 810

Integration Edit 800

FIG. 8

Integration Events

These are actual integration events that were generated by customers using your products across all marketplaces and your developer site. These events cannot be loaded using OAuth or "replayed" for security reasons; however, you can still view the entire contents of the event.

Filters and Fields 1010

| Created On | Application | Event Type / Event Token | User Company | Error Code Message | Manually Resolved? | Identifiers (account / user / generic) |
|---|---|---|---|---|---|---|
| 2/11/13 12:30:52 PM | Sample Application | SUBSCRIPTION_CHANGE 775d6f6f-a9ab-4f23-b445-0a6387770018 | 0208 Dad Shastanpa | N/A Successfully upda... | N | N/A N/A N/A |
| 2/11/13 12:18:30 PM | Sample Application | SUBSCRIPTION_CHANGE 6961fee4-0958-4837-9078-3b802ada1763 | 0765A Tanbubi XYZCorp | N/A Successfully upda... | N | N/A N/A N/A |
| 2/11/13 12:17:19 PM | Sample Application2 | SUBSCRIPTION_CHANGE 0334e1c2-04cc-4673-e655-873be076178 | 0765A Tanbubi XYZ.com | N/A N/A | N | N/A N/A N/A |
| 2/11/13 12:12:33 PM | Sample Application3 | SUBSCRIPTION_CHANGE 960e5c92-b88-4918-953ed-640f0322022 | SUBSCRIPTION_CHANGE shastapa | From IP, 172.30.4... | N | N/A N/A N/A |
| 2/11/13 12:10:52 PM | Sample Application | SUBSCRIPTION_ORDER 7065bd87-b3f8-4881-8487-0e4108b7012 | N/A N/A | N/A From IP, 172.30.4... | N | abc6f6... N/A N/A |
| 2/11/13 2:22:03 AM | Sample Application2 | SUBSCRIPTION_NOTICE 6072260-1aa2-4cf2-b398-1d8b78167731 | N/A N/A | N/A N/A | N | N/A N/A N/A |
| 2/11/13 2:22:03 AM | Sample Application2 | SUBSCRIPTION_NOTICE 1087aa13_8305_4de9-a36f dfe178Kdfi72 | N/A N/A | N/A From IP, 172.30.4... | N | N/A N/A N/A |
| 2/11/13 2:22:03 AM | Sample Application | SUBSCRIPTION_NOTICE efa6086a-c958-48a7-8b90-b2053bd4973 | N/A N/A | N/A N/A | N | N/A N/A N/A |

FIG. 10

INDIRECT AND DIRECT DELIVERY OF APPLICATIONS

PRIORITY APPLICATIONS

This application is a continuation of U.S. application Ser. No. 14/202,993, filed on 10 Mar. 2014, which claims the benefit of priority under 35 U.S.C. 119(e) to U.S. Application Ser. No. 61/780,084, filed on 13 Mar. 2013; all of which are incorporated herein by reference in their entirety.

FIELD

This disclosure is generally related to providing a marketplace platform.

BACKGROUND

The use of hosted services, or applications, for a number of corporate functions is now common. Companies, especially small or medium enterprises (SMEs), may find they face an array of bills and separate administration interfaces for each hosted service. AppDirect, Inc., offers a Marketplace-as-a-Service (MaaS) solution to address this. The AppDirect service allows channel partners to quickly establish application marketplaces to resell developer applications. This allows multiple companies to set up business-to-business marketplaces for selling applications to their customers quickly. Thus, Deutsche Telecom and Bell Canada could quickly establish marketplaces for their customers. Those customers could use the respective marketplace via AppDirect to get a single unified bill and administration interface across the offerings of multiple developers.

In this model, developers are still required to plan, develop, and build separate interfaces for directly sold applications that are distinct from the integration application programmer interface (API) used for indirectly selling applications. This adds significant unnecessary development time and other ongoing secondary administration costs, e.g. a price change must be made in multiple places. Other companies providing some partial bundles of services include: service billing, Zuora and Aria Systems; identity, Okta and Ping Identity, discovery, Jamcracker.

BRIEF DESCRIPTION OF THE FIGURES

FIGS. 6-9 show user interfaces for developer interactions with the marketplace.

FIG. 10 shows a developer report for viewing integration events occurring on the marketplace platform.

DETAILED DESCRIPTION

Overview

Figure 1:
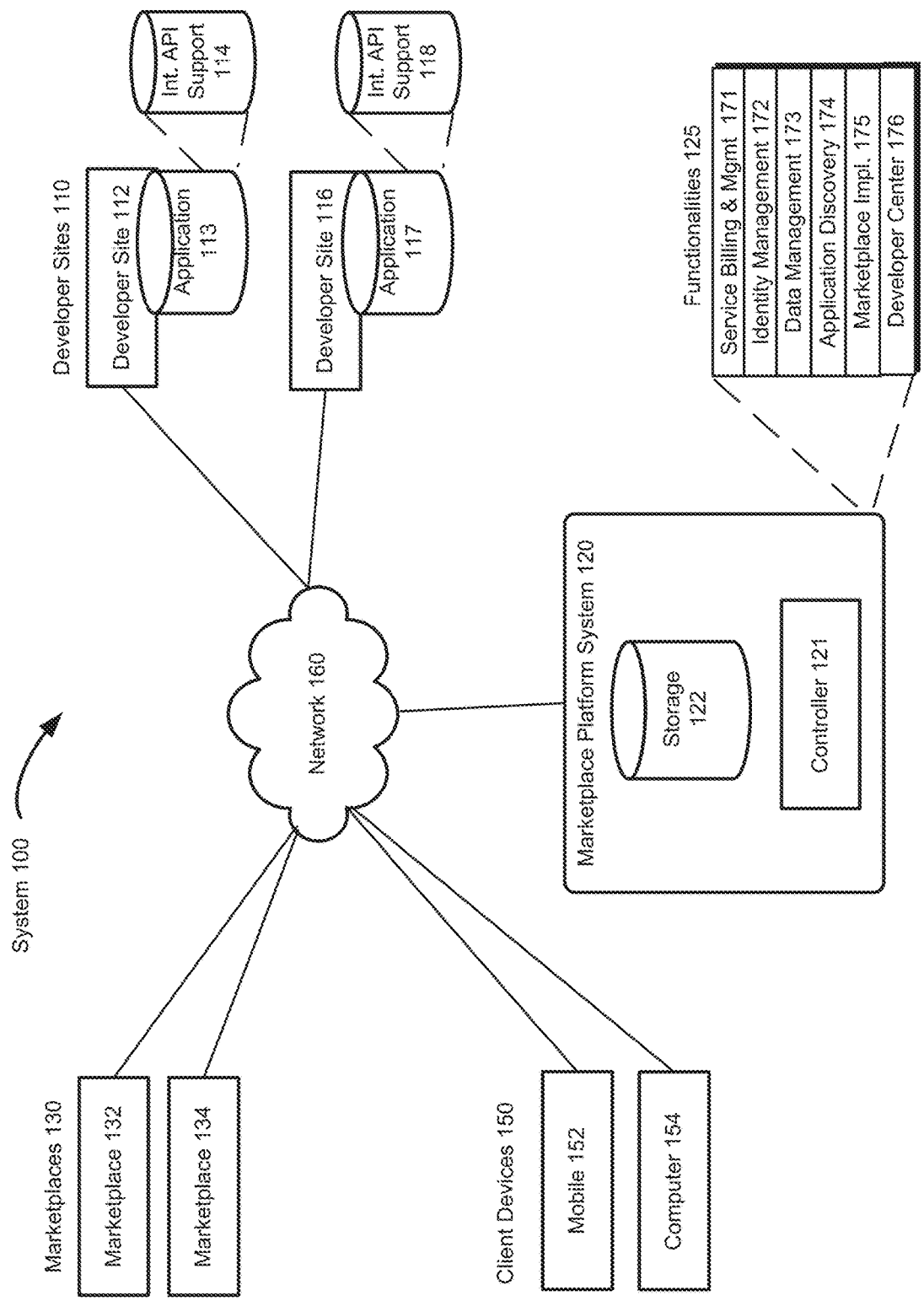
FIG. 1 shows an architectural level schematic of a system in accordance with an embodiment.

The discussion is organized as follows. First, an introduction describing some of the problems addressed by various embodiments will be presented, followed by an explanation of terminology that will be used throughout the discussion. Then, a high-level description of one embodiment will be discussed at an architectural level. Next, the algorithms used by some embodiments are discussed. Lastly, more details for implementing the system are discussed.

We describe a system and various embodiments for providing both indirect and direct delivery of applications through a marketplace platform. Consider the situation of a developer of a Software-as-a-Service (SaaS) application. Traditionally, to handle sales of the application at their own website, the developer must develop and expose a user interface to allow (potential) subscribers to perform a number of routine tasks: displaying and selecting different pricing editions, buying the subscription, assigning users to the subscription, and handling add-on sales. Supporting these direct sales to users comes at a fairly high direct cost in terms of the number of user interface screens that must be developed. Similarly, the burden remains on the developer to implement related processes and user interfaces such as billing and identity management, e.g. single sign-on (SSO).

Meanwhile, if that same developer wishes to offer marketplace (or channel) sales of their application, the developer will also be required to support the integration application programmer interfaces (APIs) for each marketplace for these same tasks. Existing marketplace platforms allow one integration API to function across multiple marketplaces. This greatly increases the reach of indirect delivery through support of a single integration API that allows many marketplaces to be reached simultaneously.

However, the developer is still handling direct delivery of the application distinctly from indirect delivery. Aside from the custom user interface that the developer must build up front, on an ongoing basis simple tasks such as changing pricing require multiple changes: once for direct delivery on your website and once for each marketplace platform.

Embodiments provide systems and methods for modifying the marketplace platform to support dual delivery of a single application via both indirect and direct delivery using a common API. Thus, instead of the developer implementing the custom UI for user assignment, the developer invokes the marketplace platform functionality for direct users. The same savings occurs in defining, displaying, and editing pricing editions. Further, the developer benefits from integrated analytics that show the developer sales across both direct and indirect delivery. Thus, instead of having to combine sales data from a proprietary billing system with the marketplace platform data, the marketplace shows all sales in one place.

Some of the terminology used in this application will now be discussed.

Terminology

Throughout this specification the following terms will be used:

Application: An "application" refers to a software product for which subscriptions having entitlements are available.

Examples of applications include Software-as-a-Service (SaaS) offerings, Platform-as-a-Service (PaaS) offerings, and Infrastructure-as-a-Service (IaaS) offerings, as well as traditional downloadable software. In colloquial terms, people talk of "buying software" to refer to the more specific legal act of obtaining a license. References to the colloquial "buying" or "selling" with respect to software should be understood as shorthand for "purchasing, or selling, a license" or just "licensing." The license itself can have many characteristics, including a time duration, e.g. perpetual or time limited. Time limited licenses are sometimes referred to as subscriptions. In the context of this patent, a "subscription" is an electronic representation of any license and "entitlements", or "user entitlements", are similarly electronic representations of the assignment of access permissions under that license to a given user. Subscriptions may have many boundary dimensions, e.g. number of users, length of access, amount of data used per time period, messages sent per time period. Thus, if "My Traditional Software Application" is a downloadable application then the subscription would correspond to the license terms, e.g. one year access for one user, and the entitlement would reflect which user was assigned the access. Similarly, for "My SaaS Application" which is a SaaS application, then the subscription would correspond to the license, e.g. ten users on standard edition at $45/user/month, and the entitlements would reflect the assignment of up to ten specific users (generally within the same company) to those ten licenses. Examples of common applications include Salesforce.com, Box.net, Dropbox, Google Apps, Amazon AWS, Microsoft Live 365, and Freshbooks.

Developer: By "developer" we mean the source of a given application. Typically this will be the copyright owner in the application. Many applications include licensed source code from third parties; however, the focus here is on the copyright ownership in the application being licensed to end users as opposed to the component pieces. It may also be an entity that serves as the developer's support point of contact for purchasers or a similar entity, e.g. a related corporation, a translation or support company for a territory. Some SaaS examples: Google is the developer for Google Apps, Microsoft is the developer for Microsoft Live, Salesforce is the developer for Salesforce.com. Additionally, in some instances the application may be licensed content, e.g. training videos/materials. The developer can also be referred to as the application source and thus applications from two different developers are considered to have different application sources.

Marketplace: A "marketplace" is itself a website, or in some cases an application, through which other applications from multiple developers can be bought. Marketplaces are generally operated by a single entity, the marketplace operator, who acts as a reseller or aggregator of multiple applications. For example, Staples or Comcast may be marketplace operators offering respective marketplaces for their customers to buy applications. Thus, small business customers of Staples can go to the Staples App Center, a marketplace, to purchase applications. Similarly, Comcast customers could do likewise at the Comcast marketplace. This indirect delivery mechanism allows developers to benefit from the reach of the marketplace operator, e.g. marketplace operator direct sales force, customer base, customer loyalty, etc. Developers are typically asked to forgo some portion of revenues to the marketplace operator in return for this support. Additionally, some marketplaces may be hierarchical, e.g. marketplace X has child marketplace Y where a dedicated system integrator team from X provides additional/different support relationships to customers.

Marketplace platform: A "marketplace platform" is a platform which provides a common framework upon which multiple marketplaces can operate. For example, prior versions of the AppDirect MaaS from AppDirect, Inc., served as a marketplace platform that simultaneously supported multiple marketplaces. The marketplace platform and the marketplaces may have their platform administration, or control, segmented. For example, some marketplaces may wish to self-host the marketplace platform system, see infra, in which case some or all portions of the system may be in an environment that shares APIs and behaviors with a public, shared marketplace platform system but have a different control hierarchy—and possibly hardware infrastructure. See the discussion of the platform admin role, infra.

System Overview

We describe a system and various embodiments for providing both indirect and direct delivery of applications through a marketplace platform. The system and processes will be described with reference to FIG. 1 showing an architectural level schematic of a system in accordance with an embodiment. Because FIG. 1 is an architectural diagram, certain details are intentionally omitted to improve the clarity of the description. The discussion of FIG. 1 will be organized as follows. First, the elements of the figure will be described, followed by their interconnections. Then, the use of the elements in the system will be described in greater detail.

FIG. 1 includes the system 100. The system 100 includes the developer sites 110, marketplace platform system 120, marketplaces 130, client devices 150, and network 160. The marketplace platform system 120 includes the controller 121 and storage 122. The marketplace platform system 120 can be viewed as providing several functionalities 125; key among them are service billing and management 171, identity management 172, data management 173, application discovery 174, marketplace implementation 175, and developer center 176. The marketplaces 130 includes marketplace 132 and marketplace 134. The developer sites 110 includes the developer site 112 and developer site 116. Developer site 112 includes application 113 which includes integration API support 114. Similarly, developer site 116 includes application 117 which includes integration API support 118. The client devices 150 includes the mobile 152 and the computer 154. During operation, described infra, the client devices can employ either web browsers (e.g. for use of web-delivered applications) as well as traditional software applications (e.g. for use of applications delivered via native applications). Some applications may span both delivery mechanisms, e.g. have both a web-based interface and a native application. For example, a suitably modified version of Dropbox might be sold via the marketplace platform system 120. A single client device, e.g. computer 154, could use both the web browser to access the Dropbox website for some functions while also employing the native Dropbox client on the computer 154.

The interconnection of the elements of system 100 will now be described. The network 160 couples the developer site 112, developer site 116, marketplace 132, marketplace 134, the mobile 152, the computer 154, and the marketplace platform system 120 in communication (indicated by solid lines). The actual communication path can be point-to-point over public and/or private networks. Some items, such as the application 113 may be delivered indirectly, e.g. the developer site may be using additional computer resources to deliver the application, e.g. Amazon AWS or Rackspace. All of the communications may occur over a variety of networks, e.g. private networks, VPN, MPLS circuit, or internet, and may use appropriate APIs and data interchange formats, e.g. REST, JSON, XML, SOAP and/or JMS. All of the communications can be encrypted. This communication is generally over a network such as the internet, inclusive of the mobile internet, via protocols such as EDGE, 3G, LTE, Wi-Fi, and WiMAX. Additionally, a variety of authorization and authentication techniques, such as username/password, OAuth, Kerberos, SecureID, digital certificates, and more, can be used to secure the communications.

The marketplace 132 and the marketplace 134 can be a collection of (web) servers delivering a marketplace to client devices 150, e.g. by making use of the marketplace implementation 175 of the marketplace platform system 120. This allows users of client devices such as the mobile 152 or the computer 154 (or, more generally, any computing device) to purchase applications via the marketplace. As noted, in some embodiments the marketplace may be delivered as a downloadable application for use on the client devices 150.

Similarly, the developer site 112 and developer site 116 can be a collection of (web) servers delivering the respective applications to end users of client devices 150—irrespective of the point of purchase. Additionally, the developer sites 110 have applications that implement support for the integration API as the mechanism for direct sales. Thus, the applications of the developer sites 110 omit traditional custom user interfaces for user assignment and purchase and rely instead on the marketplace platform system 120 to provide those services.

Controller 121 and storage 122 can include one or more computers and computer systems coupled in communication with one another. They can also be one or more virtual computing and/or storage resources. For example, controller 121 may be one or more Amazon EC2 instances and storage 122 may be an Amazon S3 storage. Other computing-as-service platforms such as Force.com from Salesforce, Rackspace, or Heroku could be used rather than implementing marketplace platform system 120 on direct physical computers or traditional virtual machines.

Figure 2:
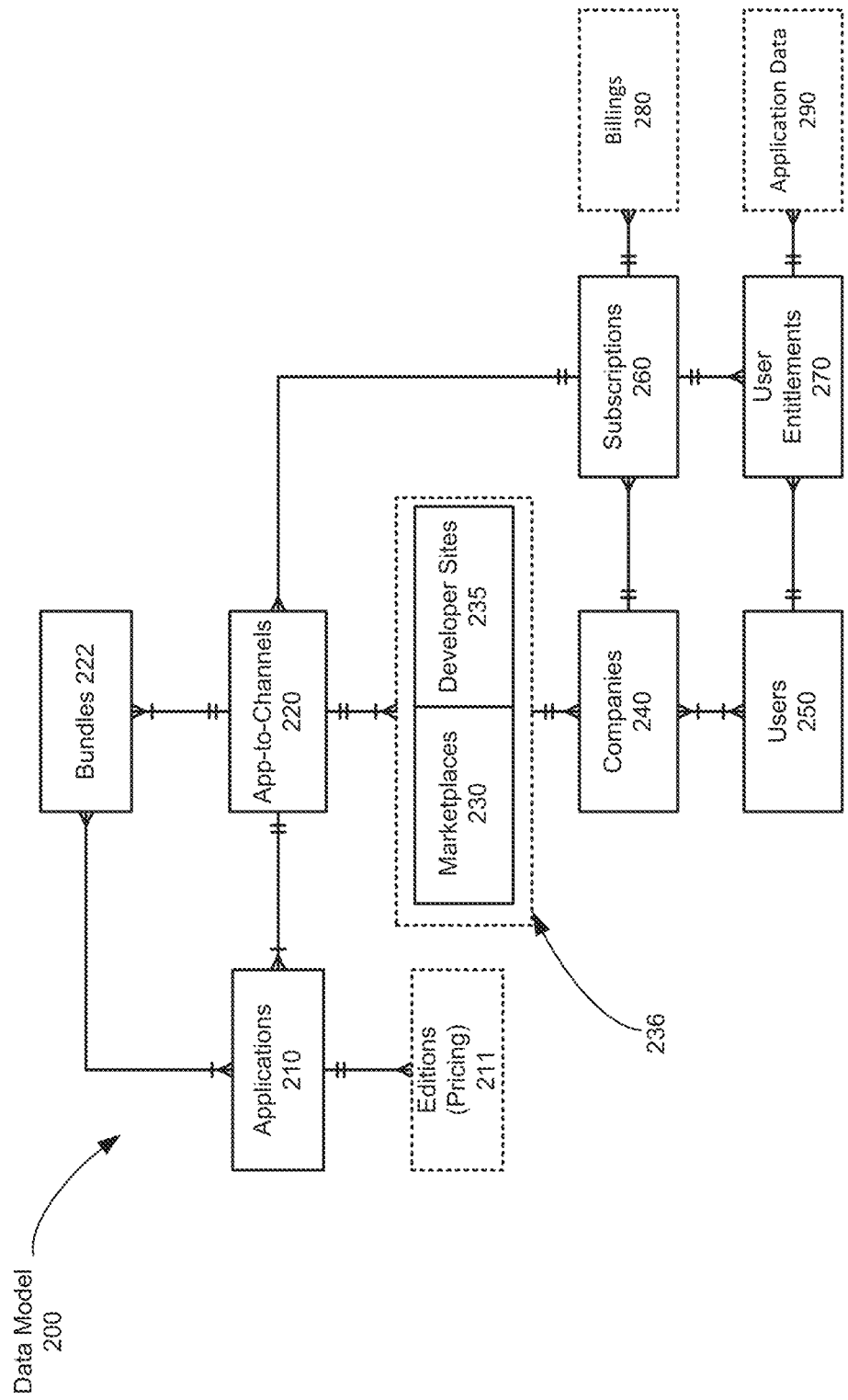
FIG. 2 shows a high-level view of the data model of a system in accordance with an embodiment.
Figure 3:
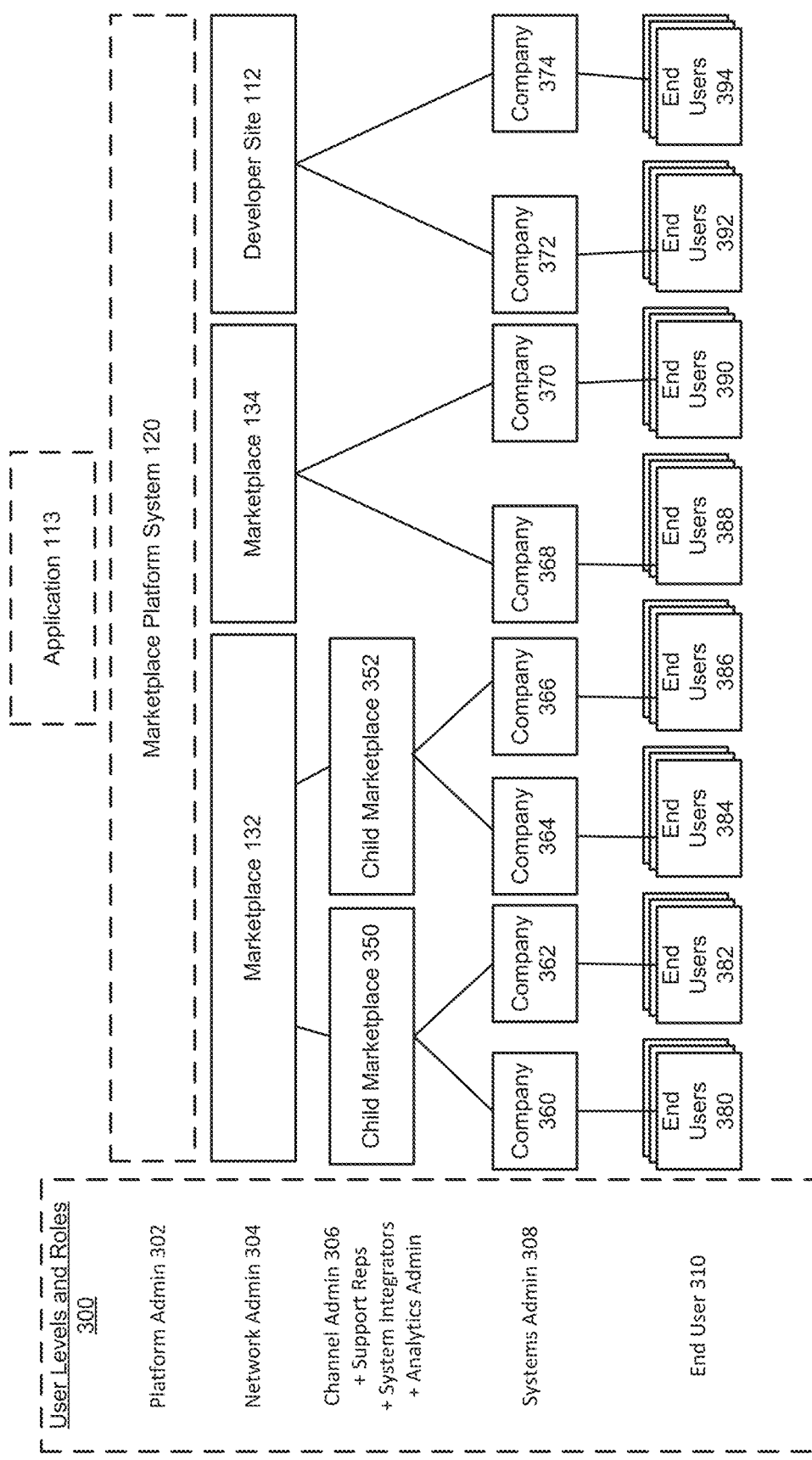
FIG. 3 shows a conceptual view of the different distribution mechanisms supported by the marketplace platform.

Having described the elements of FIG. 1 and their interconnections, elements of the figure will now be described in greater detail with reference to FIGS. 2-3. FIG. 2 shows a high-level view of the data model of a marketplace platform system 120 in accordance with an embodiment. FIG. 3 shows a conceptual view of the different distribution mechanisms supported by the marketplace platform.

FIG. 2 is only one possible data model used by an embodiment; other data models may be used. It should be understood that the data model 200 in FIG. 2 can be implemented in one or more databases, object relational mapping (ORM) systems, and/or any other appropriate data storage with the corresponding data stored in the storage 122 and managed by the controller 121. If a SQL-style database is used, each box in data model 200 loosely corresponds to a table with rows of the table containing the appropriate contents. Additionally, data model 200 focuses on key data elements stored by the marketplace platform system, rather than on every data element in the storage 122. Furthermore, as indicated by the dotted box 236, the data model 200 does not fully describe the table structure since either marketplaces 230 or developer sites 235 can be linked to app-to-channels 220 or companies 240. For example, the companies 240 could be stored as a table with one row per registered application, and an intermediate table would be used to connect the companies table with the users table (users 250) to support the many-to-many relationship. In other data storage approaches, intermediate tables might not be required, and for that reason such intermediate, or join tables, are generally omitted from the data model of FIG. 2.

FIG. 2 includes applications 210. Each application in applications 210 can have zero or more editions 211. As shown, according to one embodiment, editions have associated pricing information. Each application in applications 210 can be a part of zero or more bundles 222. A bundle allows marketplaces to offer special pricing for purchasing multiple applications. An application can in, some embodiments, designate optional editions that can be only offered as part of bundles. Each app-to-channel (app-to-channels 220) enables a specific application (or bundle) to be sold either indirectly on a marketplace 230 or directly on a developer site 235. This allows for customization of the application for the specific channel, e.g. custom naming, per-channel reviews, and more. Thus, a company (companies 240) purchases one or more subscriptions (subscriptions 260) to an app-to-channel (app-to-channels 220), e.g. the application as published for that delivery channel or marketplace. Similarly, users (users 250) belong to one or more companies (companies 240) and users can have one or more entitlements (user entitlements 270). Each entitlement (user entitlements 270) is for one subscription (subscriptions 260). Additionally, to highlight the capability the billing 280 is shown linked to subscriptions. Similarly, application data 290 is shown linked to user entitlements 270.

Turning to FIG. 3, a view of access to the application 113 from different delivery mechanisms is shown, together with potential user levels and roles 300 that can be assumed within the operation of the marketplace platform system 120. FIG. 3 includes the application 113 coupled to the marketplace platform system 120, both represented with dotted boundary lines to represent the logical as opposed to physical relationship. Two marketplaces are shown, marketplace 132 and marketplace 134 (indirect delivery), together with the developer site 112 (direct delivery). Marketplace 132 is shown to have two child marketplaces, child marketplace 350 and child marketplace 352. As noted, this can enable the marketplace operator to further offer distinct channels to their customers, e.g. a self-supported option and a system integrator, heavily supported option.

The child marketplace 350 serves company 360 and company 362. Child marketplace 352 serves company 364 and company 366. Marketplace 134 serves company 368 and company 370. Meanwhile, the developer site 112 directly serves company 372 and company 374. Each company has respective end users (end users 380-394) as indicated by the solid lines, e.g. end users 380 are associated with company 360.

As FIG. 3 emphasizes at each level, there are different user levels and roles available. At the marketplace platform system 120 level, there is a platform administrator 302. This may be one or more groups of people responsible for administrating the marketplace platform. The platform administrator 302 is responsible for granting access to marketplaces 130 and developer sites 110 to the marketplace platform system 120. This may be via an automated system with minimal user intervention; however, the platform administrator has sufficient privileges to modify access at that level. Because of the hierarchical nature of the policies across the ecosystem, it is not the case that a platform administrator 302 can necessarily perform tasks of a lower level admin, etc. Similarly, a private marketplace platform may be offered by an entity using common systems to a public marketplace platform in the form of a separate identity of the platform administrator 302 providing separate control (not shown in figures).

At the marketplace and developer site level, there is a network administrator 304. For developer sites, this would typically be a representative of the developer. For marketplaces, this would typically be a representative of the marketplace operator. The network administrator 304 may be a superuser for their associated company. At the child marketplace level, there are more types of administrator, from a channel administrator 306 to more finely grained permissions: support representatives, system integrators, and analytics administrators. These child marketplace roles can also be available for assignment to individuals even if no child marketplace is present, e.g. for marketplace 134 and developer site 112. The final role is that of an end user 310. The roles will be further described briefly. Note that different implementations and embodiments may offer different roles to meet the specific business needs of marketplace operators, developers, and the marketplace platform operator. Note, also that same role terms are used across both marketplaces and the developer site for consistency.

Platform Administrator 302: This is usually an employee of the marketplace platform system operator who has control over the marketplaces on an instance of the system 120. A single marketplace platform system operator can instantiate separate instances of the system 120. There may be additional finer grained-access roles for platform administrators, e.g. paralleling the access roles for channels to better support marketplace operators and developers.

Channel Administrator 306: This is usually an employee of the marketplace operator who has control over the marketplace including the ability to configure layouts, approve applications and manage end-users. For marketplaces that have sub-marketplaces, a network administrator 304 role is also available which can control all of the sub-marketplaces and thus delegate a per market place channel administrator 306 to each child marketplace.

Support Representatives: This is a customer support representative of a marketplace (or group of marketplaces) that has the ability to manage end-users. In one embodiment, the distinction from a channel administrator is that support representatives cannot edit the marketplace layout settings or the applications that are being sold within the marketplace.

Systems Integrators and Analytics Administrators: These roles are examples of fine-grained roles that can be established within a marketplace platform for marketplaces and developer sites. These roles have different, generally fewer, permissions than the channel administrator. For example, the analytics administrator might solely have access to marketplace analytics information or developer analytics information (see, e.g. FIG. 12). Similarly a system integrator who sets up multiple applications for companies may have additional permissions beyond those of a customer support representative to set up and configure a companies' subscriptions. In some cases, the systems integrator may also serve as a systems administrator for a company.

Systems administrator 308: A systems administrator is usually an employee of a company that manages who has control over the company use of applications via the marketplace platform system. The systems administrator has the ability to manage other company end users as well as the billing relationships with applications purchased by any end user members of the company.

Billing Administrator (not shown): A billing administrator is usually an employee of a company and in an analogous fashion to the analytics administrator role, has different permissions than an end user within the company, but less permissions than the systems administrator. In one embodiment, billing administrators have permissions to manage the billing relationships with applications purchased by members of the company. In some embodiments, the billing administrator role may have hierarchical limits based on the organization chart and company imposed policies, e.g. dollar limit on purchases and/or only affect employees within their organization.

Collectively considering FIGS. 1-3, the operation of the marketplace platform system 120 will be discussed using an example. Consider Jane Doe, the CEO of a new startup developer, StartCo. StartCo is developing a hot new enterprise application, a Software-as-a-Service (SaaS) for expense reporting, Expense Application. Jane knows that if she wants to get the Expense Application into the hands of as many companies as possible she needs to get wide distribution of the Expense Application. She decides to build her application (application 113) from the ground up using the integration API support (integration API support 114) to sell to customers directly. This means that customers visiting StartCo's website (developer site 112) will be able to purchase the application 113. This enables her to save a tremendous amount of development costs by eliminating the need to develop a variety of user interface components for administration that she can now rely on the marketplace platform system 120 to provide. Further, when she changes the price for her application on the marketplace platform system 120, the price on her own website will change at the same time.

Additionally, without having wasted development on a custom user interface for user assignment, purchases, custom billing, and the like, Jane is also able to leverage support for the integration API to launch her application on a large number of marketplaces 130 without any modifications. More specifics of this process will be discussed in connection with FIGS. 5-9, infra. Jane uses the developer center 176 functionality of the marketplace platform system 120 to define her application and connect the marketplace platform system 120 to her application 113 and integration API support 114. Once ready, Jane can publish the application to direct sales.

With direct sales, interested individuals using client devices 150 can visit the developer site 112 and purchase subscriptions to the application 113 via the marketplace platform system 120. In contrast to traditional direct purchases, everything is happening on the marketplace platform system 120. Thus, returning to the data model 200, appropriate company (companies 240) and user (users 250) records are created for the subscription (subscriptions 260). Consider Kyle, who owns a small business that is interested in Jane's Expense Application. Kyle has his finance person, Susan, sign the company up directly at the developer site 112. Susan would serve as the systems administrator 308 for the Expense Application for Kyle's company (company 372) and the developer site 112 points Susan at interfaces provided by the marketplace platform system 120 to purchase the subscription (app-to-channel 220) and assign user entitlements (e.g. give Kyle and others at the small business access). These marketplace platform system 120 interfaces may in some embodiments be embedded frames, applets, or embedded markup that renders appropriate user interface generated by the marketplace platform system 120 to Susan while she is visiting the developer site 112.

Jane is excited by the uptake of her Expense Application directly and decides to let a variety of third-party marketplaces start hosting the application. Those marketplaces can chose to publish the Expense Application and directly enroll companies and end users as well.

For example, Sofia's small business is a BigTelco customer (marketplace 132 for this example) that works with a systems integrator there (child marketplace 350 for this example) to fully manage their IT needs. Sofia talks to the relationship contact at the BigTelco system integrator about getting the Expense Application. The BigTelco system integrator purchases the subscription (subscriptions 260) for Sofia's company to the Expense Application as published in child marketplace 350 (app-to-channel 220). The BigTelco system integrator can also perform additional value added services for Sofia's company. Alternatively, individuals with appropriate permissions in a company could purchase the application 113 directly, e.g. via marketplace 134 from company 368.

At the end of each appropriate time period (e.g. monthly, weekly, daily, quarterly, yearly), subscribers to the application 113 will receive bills, invoices, and/or credit card charges, based on their subscriptions (billing 280; service billing and management 171). This is true irrespective of the customer origin: direct vs. indirect. From the developer's perspective the integrated billing for their direct customers is a timesaver vs. having to develop the user interface, business logic, and support team for payments.

Summarizing, FIG. 3 shows the conceptual relationship between end users 380-394 and their access to application 113. In contrast to FIG. 1 which shows a more architectural view, the mediation of application access via the marketplace platform system 120 is emphasized—even for direct customers of application 113 who purchase the application direct from the developer at developer site 112. This interrelationship need not take the form of direct network packet exchange. For example, direct purchasers of the Expense Application from StartCo might visit www.startco.com and sign in without being made directly aware of the presence of marketplace platform system 120.

The power of the approach is in what the developer, StartCo, was able to omit and also changing the meaning of the data in StartCo's system. Framing the contrast differently, in a traditional system, the StartCo records of direct customers would be the "golden master." In contrast, now, the marketplace platform system 120 serves that purpose. When the marketplace platform system 120 generates an integration event to add a subscription that creates a new company. Similarly, marketplace platform system 120 events describe the assignment/unassignment (or removal) of users. Similarly, a single pricing change on the marketplace platform system 120 now propagates out instantly to the display on your direct developer site 112, as well as to any marketplaces 130 hosting your content. Note this golden master concept also implies that if StartCo wishes to perform an audit of licenses, security permissions, or the like, the starting point is the records of the marketplace platform system 120.

Summarizing the key functionalities 125 provided by the marketplace platform system 120 for developers that aid in simultaneous direct and indirect delivery via the same integration API:

Service Billing and Management 171: Customers are automatically billed according to the pricing plans that the developer defines. If a subscription needs to be cancelled, the interface is provided by the marketplace platform.

Identity Management 172: The marketplace platform system 120 handles identity management issues, e.g. single sign-on, corporate directory services integration. This saves developers from implementing their own solution.

Data Management 173: The marketplace platform system 120 stores relevant data (beyond subscriptions/entitlements), e.g. logs, event histories, billing receipts, reports, usage data, and potentially even custom application-defined data (all, collectively, application data 290). For example, at one extreme, the marketplace platform may offer storage to applications so that instead of data residing with the developer site 112, the data resides with the marketplace platform.

Application Discovery 174: Although not relevant to direct delivery, the application discovery 174 functionality assists in the promotion and distribution of the application via marketplaces. Related functionality includes customizable review visibility on a per-marketplace basis.

Marketplace Implementation 175: This is the functionality used to display and power marketplaces. Although not relevant to direct delivery, the direct delivery mechanisms can leverage portions of this functionality, e.g. for reuse of edition/pricing display and user assignment interfaces.

Developer Center 176: This is developer-focused functionality for linking your application to the platform and is discussed in greater detail, infra.

Processes

Figure 4:
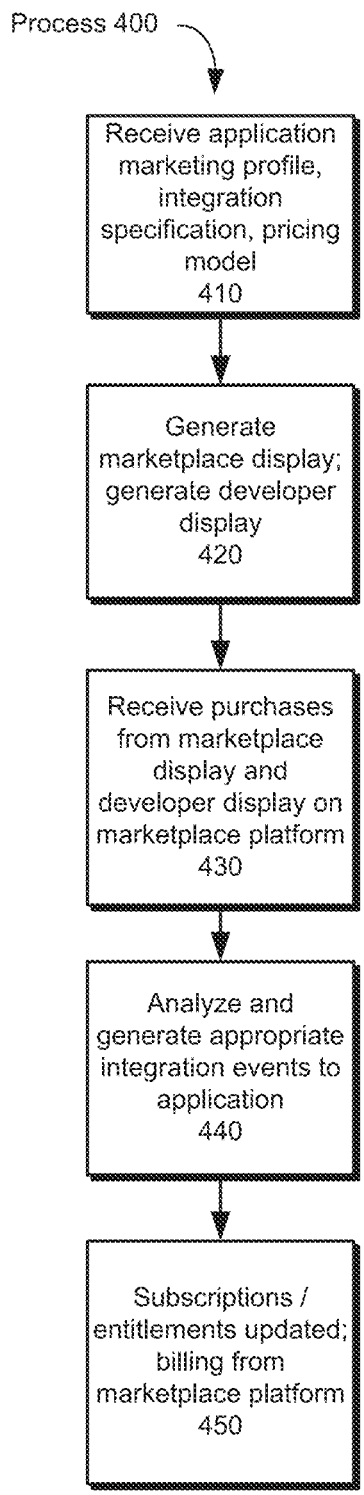
FIG. 4 is a process flow diagram for indirect and direct delivery of an application.

Having discussed the architecture, data model, and the conceptual distribution channels, we turn to FIG. 4, a process flow diagram for indirect and direct delivery of an application. FIG. 4 includes process 400 that starts at step 410 with receipt of at least the following for an application: a marketing profile, an integration specification, and one pricing model (aka edition). The marketing profile is the basic information about an application including at a minimum a name or identifier. More typically, the marketing profile includes one or more icons, screenshots, testimonials, and/or descriptions. In some instances the marketing profile may include one or more URLs where a user can obtain additional information. One component of the marketing profile may also include, either directly or via links: terms of service, an end-user license agreement, a privacy policy, and/or other similar legally governing documents for using the application. The integration specification is a machine-readable description of how the marketplace platform system 120 can invoke the application's support for the integration API, e.g. integration API support 114 for application 113 or integration API support 118 for application 117. In one embodiment, the integration specification is a collection of URLs for invoking the integration API in a RESTful manner on the application. Lastly, at least one pricing model (or edition, e.g. editions 211) has to be defined according to some embodiments. Note that some embodiments may allow late definition of editions as demonstrated by the dotted line in FIG. 2. Note that more generally uniform resource indicators (URIs) could be used by some embodiments.

According to one embodiment, a minimum required at step 410 is an application name and an integration specification. Further details and an exemplary user interface for input by developers to accomplish portions of step 410 are shown in FIGS. 6-9.

If step 410 is viewed as the definition of an application (e.g. establish applications 210 and editions 211), then when process 400 continues at step 420, the application is published. See discussion infra of FIG. 5 and the application publication flow according to one embodiment. Thus, at step 420, two distinct displays are generated, e.g. for rendering in web browsers of the client devices 150: a marketplace display and a developer display. These displays may comprise dynamically generated HTML and/or Javascript code that is only generated in response to a client device request via the appropriate channel. Requests via the marketplaces 130 generate the appropriate marketplace display, while requests via the developer sites 110 generate a developer display.

The displays are different in that a marketplace display supports the display of multiple applications from a variety of developers simultaneously. This may also include showing a variety of already subscribed/purchased applications in a launching pad type view. As unpurchased applications are selected in the marketplace display, the pricing editions can be reviewed and the application purchased. Thus, a type of shopping experience somewhat analogous to the flow for buying from the Google Play store with a web browser is provided.

In contrast, the developer display is generally invoked selectively by the developer site within their own website. Thus, rather than a shopping experience, the developer site is focused on selling their application with custom-crafted marketing messages in a freeform content. That said, the marketplace implementation can be selectively invoked to display the current price, or even an automatically generated pricing grid. Thus, the developer display could be as small as a "buy" button or a price plus a "buy" button, while the marketplace display is a more full-fledged shopping experience.

In either case, the process continues at step 430 with the receipt of purchase signals, from both indirect and direct sources, at the marketplace platform. Thus, even for a direct purchase, the "buy" signal comes to the marketplace platform rather than the developer.

Side note on analytics and tracking tools: much like Google rewrites links in search pages to ensure they can track outbound clicks, in some instances developers may choose to wrap direct requests to the marketplace in tracking codes that route to their own site or a third-party analytics service before forwarding them to the marketplace platform. This type of wrapping will be ignored in this discussion and be viewed as a direct signal to the marketplace platform.

At step 440, these "buy" signals from both marketplaces and developer sites are analyzed and translated into appropriate integration events to the application, for example by making an HTTP GET request to the correct URL indicated in the integration specification with an event, e.g. SUBSCRIPTION_ORDER, for a new subscription.

At step 450, a response to the integration event is received, e.g. SUCCESS, or FAIL, together with appropriate secondary information. At that point subscriptions and entitlements for the company/user are updated. Additionally at step 450, on an ongoing basis billing will occur for both direct and indirect users via the marketplace platform system.

Steps 420-450 can be repeated for additional requests from users. Additionally, although the marketplace and developer tracks are described in an intertwined fashion, the focus should be on the simultaneous indirect/direct delivery support via a common process, and API. Thus, for example, it may be that if there are no purchases at time t0 from marketplaces, process 400 can occur for the developer site alone, and at some other time, t1, it may be that there are only purchases occurring from multiple different developer sites.

The approach of steps 420-450 of process 400 also reflects the pattern that can be repeated for other uses of the marketplace platform to provide functionality to direct purchasers at the developer site: subscription order, change, cancel, and status inquiry (for display); add-on orders, changes, cancel, and status inquiry; user access assign, unassign, and synchronized fields. Add-ons are any additions beyond the basic edition pricing for a service, e.g. if there is a per-X charge, that could be an add-on, or a functionality, e.g. access to certain features only available at an extra cost.

Figure 5:
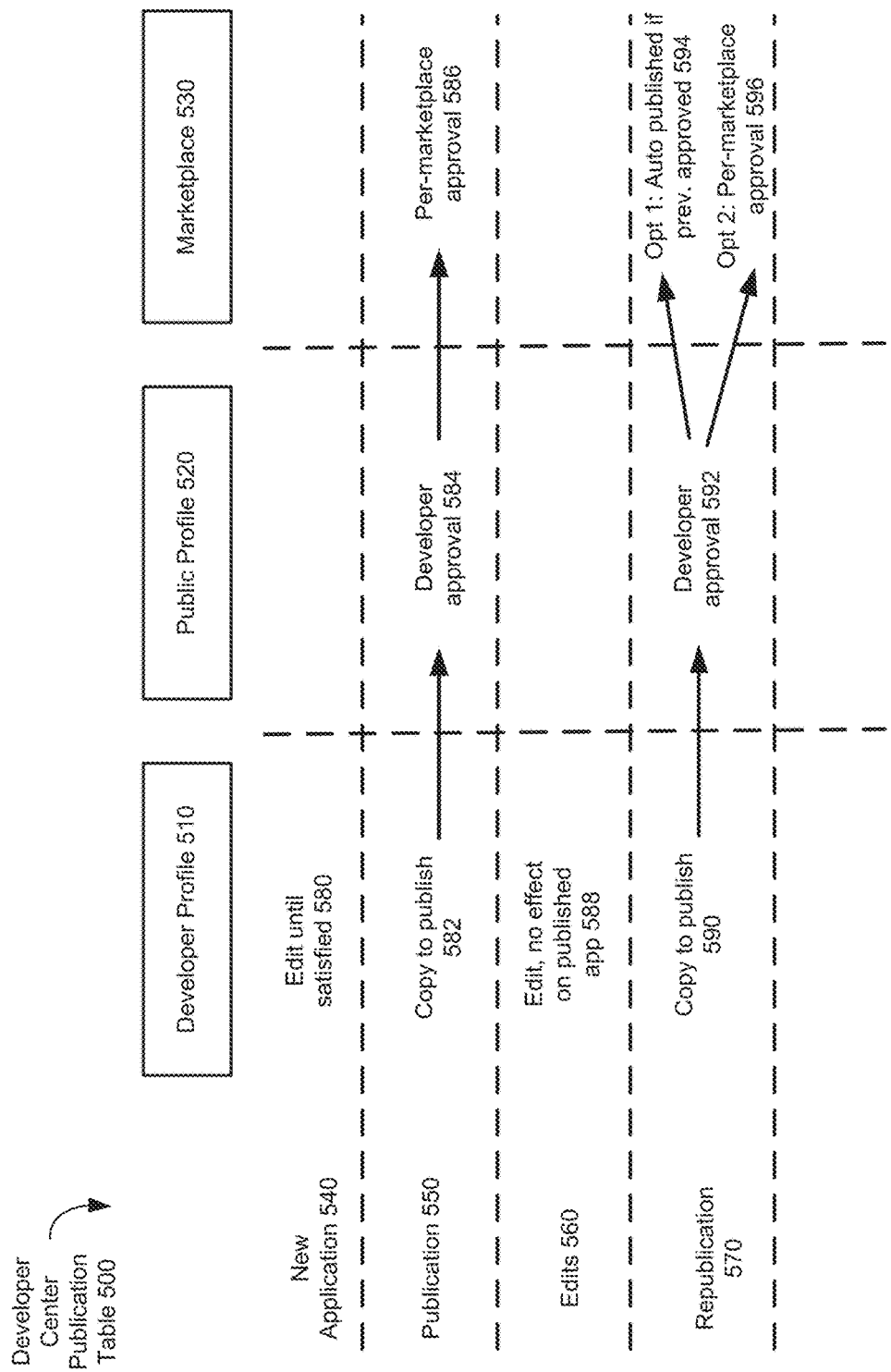
FIG. 5 is a table showing the developer publication flow.
Figure 6:

FIG. 5 is a table showing the developer publication flow in developer center publication table 500. The developer center publication table 500 across the top considers the status across three distinct areas: the private developer center view of an application (developer profile 510), the public view of an application (public profile 520), and one marketplace (marketplace 530; additional marketplaces not shown to conserve space). Four distinct time periods (time running from the top of the page to the bottom) are considered: a new application 540, (initial) publication 550, edits 560, and republication 570.

Considering again Jane at StartCo, when she wants to add the Expense Application, the flow starts in the top left with a new application 540 which she can edit until satisfied 580. Thus, Jane is able to edit the marketing profile, integration specification, and define one or more editions resulting in defining the application and edition in applications 210 and editions 211, respectively. This corresponds closely with step 410.

After Jane is satisfied, she can move to publication 550. In one embodiment, the application information is copied for publication 582. This is a marketplace platform implementation choice to provide a type of lifecycle management and control over applications. The effect of publication according to one embodiment is testing of the integration specification via transmittal of events (see infra for discussion of consolidated integration status report in FIG. 11). If all of the integration tests pass, then the application is moved to developer approval 584 as a public profile. In some embodiments this automatically starts the developer's direct sales, e.g. an appropriate app-to-channel 220 entry is created and the application goes live.

Additionally, the application is now ready for per-marketplace approval at step 586. At this stage each marketplace (e.g. marketplace 530 here) can approve Jane's application. In some embodiments, child marketplaces follow their parent marketplace's approval decisions. At this stage the marketplace also has options to customize one or more fields (e.g. in app-to-channel 220) such as a SKU for their own internal recordkeeping, a custom name (for language localization), and the like. In some embodiments, the capability is available to fully customize the entire application profile, e.g. name, overview, description, features, support information, and editions.

Jane can now work on changes for future versions of the application without affecting existing customers or marketplaces—edits have no effect on published applications 588. Notably, the types of edits discussed here are to the application description, e.g. marketing profile, integration specification, and pricing models (or editions). The marketplace platform decouples these from the implementation of the application. Thus, the developer can make constant improvements to their application without making the types of edits discussed here.

When the new version is ready, Jane can republish 570. Again, a copy to publish 590 model is used by this embodiment for the reasons discussed, supra. Once again, developer approval 592 is required. It bears mentioning that the developer center may have a hierarchy of users and permissions so the approvals (584, 592) may be from a different user than the one who submitted the (re)publication request. Additionally, as discussed, integration event testing can be part of this process.

As before, upon approval the application is available to direct customers of the developer. However, depending on the marketplace platform configuration, one of two flows occurs for marketplaces. The first, option 1, is that all previously approved applications are automatically published into the channel 594. The second, option 2, is that per-marketplace approval 596 is required.

The two-stage approval for publication 550 and for option 2 of republication is a unique flow to marketplace platforms. Like having to turn two keys to launch a missile, this approach provides marketplaces greater control over how potentially disruptive changes in applications reach their customers.

Not shown are the flows and mechanisms for deactivating or depublishing applications. In some embodiments they parallel the flows for publication. For example, marketplaces can depublish applications at any time and potentially still leave the application available to existing customers—or potentially turn it off after the passing of a certain (contractual) period. Similarly, developers may depublish applications along a similar process—though depending on the contractual relationships, marketplaces may have a similar say over depublication requests.

Some embodiments include marketplace platform rules for whether or not additional approvals are required on republication. For example, price decreases might flow through option 1, while price increases might require option 2. Note, as a practical matter, developers are not expected to support old editions indefinitely and the marketplace platform may have rules that encourage certain extended support practices. In some embodiments, there is special handling for price changes. For example, if existing companies and users are paying $5/user/month, but the developer wishes to raise the price to $6/user/month, the marketplace may offer a variety of options for developers and/or the marketplace to transition companies to the new pricing plan. For example, users could be notified of a specific timeline, e.g. 90 days, when the new price will take effect. Alternatively, existing users could be grandfathered at the older pricing for an extended period.

Developer Center

Having provided a broad overview of the system and several processes, FIGS. 6-12 which show a variety of user interfaces for the developer will be discussed. All of FIGS. 6-12 could be portions of the view of a client device 150 using a web browser to interact with displays generated by the marketplace platform system 120. Additionally, the user interface depictions are intentionally sparse (e.g. browser frames and menu bars are omitted) to focus on key elements in relation to the processes discussed in connection with FIGS. 1-5.

Figure 9:
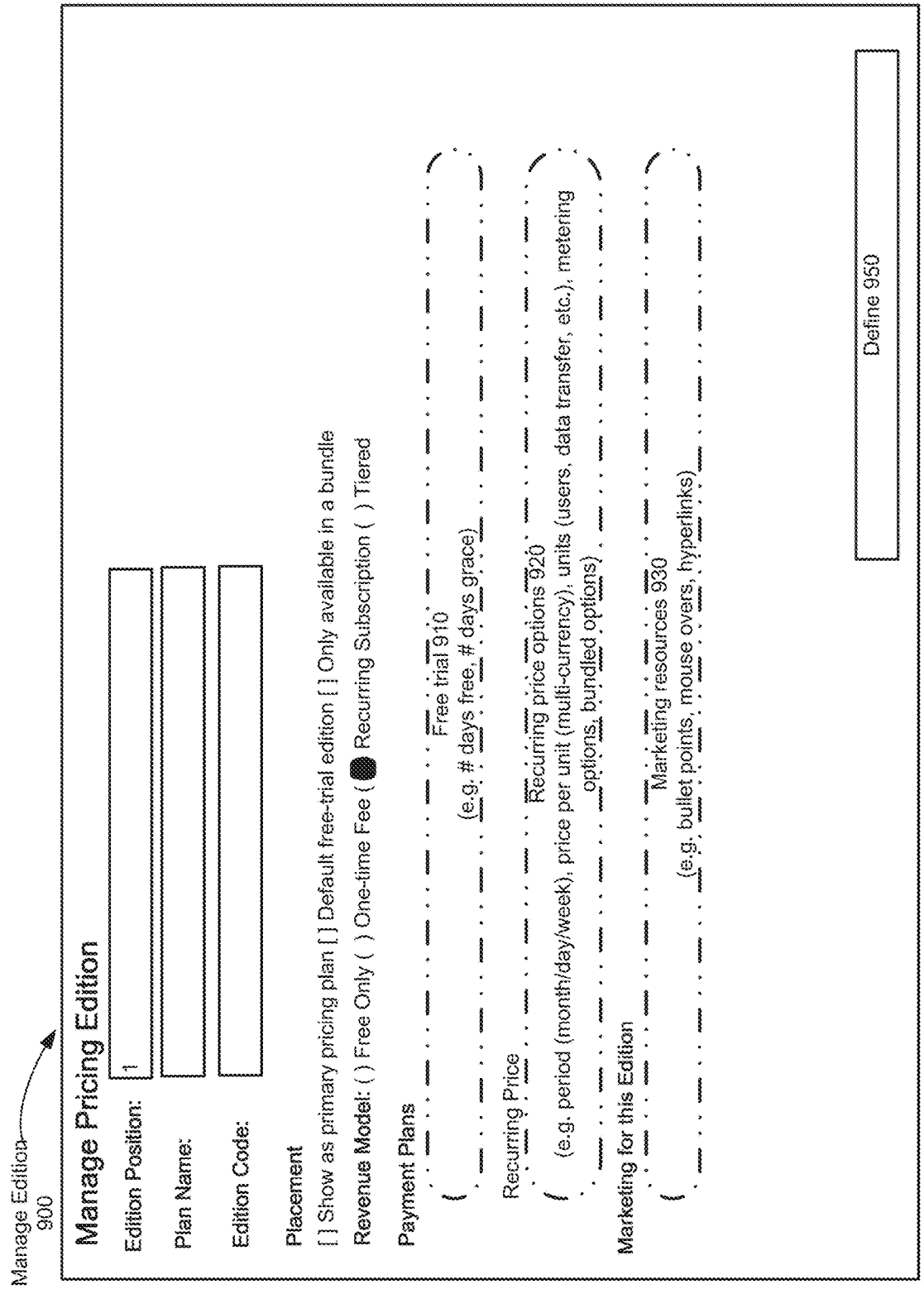

FIGS. 6-9 show user interfaces for developer interactions with the marketplace. These user interfaces are one embodiment for capturing the marketing profile, integration specification, and pricing model (or editions) of an application, see discussion of step 410 of FIG. 4, supra. Starting with FIG. 6, a developer center 176 interface provided by the marketplace platform system 120 is shown, including an application creation 600 screen. In this embodiment, the barest of information is captured to define the application within the marketplace platform system 120: name, integration type (full integration of the type we've been discussing vs. referral links only, not discussed), usage models (single vs. multiple users—single-user applications may have simpler user interfaces, e.g. user assignment interface may be simplified since the person buying can simply be assigned the entitlement for the application in some embodiments), and revenue model (free, one-time fee, recurring subscription, or tiered). In some embodiments, referral integrations are links to the developer site for purchase; therefore, referral integrations therefore do not support the single point of management for both developer sites and marketplaces. In some embodiments, when the user completes the form and clicks the create application 610 button and a signal is received by the marketplace platform system with the inputs, it may be possible to instantiate both the application and one edition. For example, a free only application could have a $0 pricing model edition automatically created. In some embodiments, the application creation 600 screen is a dynamic form with pricing options, as seen in FIG. 9, being revealed in place dependent on the developer's inputs. The shown embodiment uses multiple simple forms and the application dashboard 700 of FIG. 7 to stage the application definition process.

Figure 7:
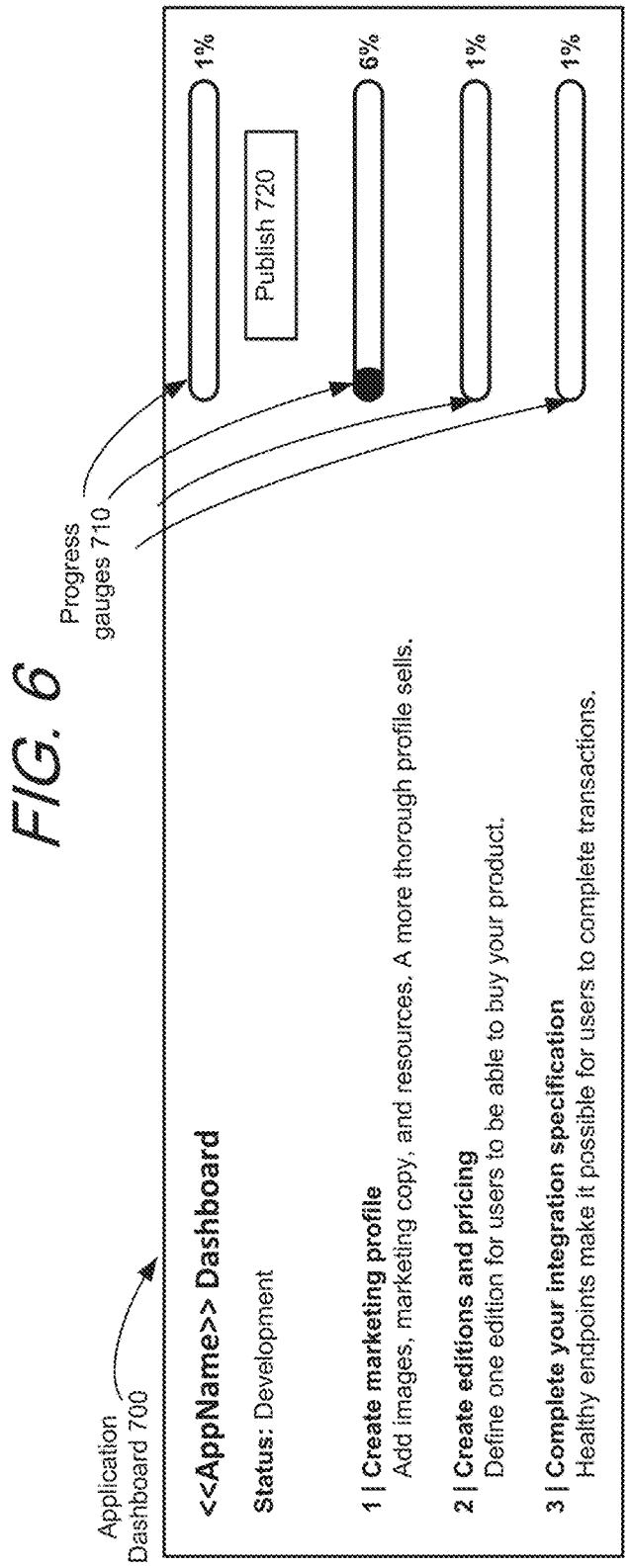

Turning to FIG. 7, the application dashboard 700 screen is shown. Note that there are progress gauges 710 to provide the developer a perspective on how complete their progress is. Although the steps are numbered 1-to-3 (create marketing profile, create editions and pricing, complete your integration specification, respectively), they can be completed by the developer in any order. Returning to Jane and StartCo with the Expense Application, Jane plans a complete tiered pricing model, so the application dashboard 700 is mostly incomplete. However, since she provided the application name earlier, the marketing profile shows some completion, 6% here. FIG. 7 also includes a publish 720 button. This would trigger the flows discussed in connection with FIG. 5 and, once published, enable users to purchase the application, e.g. steps 420-450 of FIG. 4, both directly and indirectly.

In some embodiments, the publish 720 button will return an error unless specific progress gauges are above a certain point. For example, for full integration products, 100% completion of the integration specification may be required. Additionally, as discussed, integration event testing may also occur before publication completes. This ensures that published applications can perform basic tasks: purchase subscriptions, (un)assign users, purchase add-ons, allow users with entitlements to sign on. The progress gauges can be particularly helpful for providing an at-a-glance view of an application's readiness for sale. In this embodiment, the top-most progress gauge above the publish 720 button summarizes the overall progress across each of the three areas in one view. In some embodiments, the publish 720 button may be disabled and/or dimmed until the application is in a publishable state as defined by the marketplace platform system operator's procedures. Instead of progress gauges, icons and/or other visual indicators may be used, e.g. red-yellow-green icons, frown-neutral-happy icons.

The marketplace platform can also include an interface that shows the performance of published applications, monitoring the number of errors end-users have while buying, assigning and using the application. The marketplace platform system—or an individual marketplace—can optionally turn off aspects of the integration if a threshold number of errors is reached. For example, if there are more than X users, e.g. 5, where the purchase integration reports failures to buy an application in Y hours, e.g. 12, then the application is no marked to be unavailable for purchase in the marketplace. However, users who have already purchased the application can continue to upgrade, assign and use the application since no issues were observed with those functions. The specific levels for deactivation can be set on both a platform-wide as well as a marketplace and developer site basis. Reactivation can be manual, e.g. developer is sent a notice of the deactivation and must perform some action to reactivate and/or automatic, e.g. no integration test failures for a period of Z hours after a deactivation.

Marketplaces and developer sites can also chose to manually resolve integration failures with applications. For example, if an end user attempts to purchase an application and the integration API for the application fails, the user could be told that the application they purchased will be provisioned shortly instead of being informed that their purchase failed. The marketplace or developer site can then contact the developer support team to resolve the issue, resend the API call, and/or manually enter the result of a successful API call. Once the integration API call has been resolved the user will be informed that their application has been successfully provisioned and they can now begin using their application. This sort of delayed provisioning can be highly valuable to prevent customer loss during intermittent down times and disruptions: a customer trying to buy an application might abandon their purchase with a failure, that same customer now is simply waiting for their point of sale (marketplace or developer site) to finish the provisioning.

The developer interface for providing additional marketing profile information is not shown, but a similar type of interface as discussed in connection with FIGS. 6-9 can be provided. Through that interface, the developer can provide icons, screenshots, hyperlinks, list application features, provide videos, and more. Additionally, in some embodiments marketplace operators can supplement this marketing material with their own for positioning and promotional purposes.

Turning to FIG. 8, the integration edit 800 screen is shown. This screen allows the developer to provide their integration specification to the marketplace platform system. In some embodiments, this could be provided in an electronic file. In some embodiments, the marketplace platform system may have a convention for searching using DNS or a defined URL, e.g. always retrieve developersite.com/integrationspecification.xml. In this embodiment, the integration specification is implemented as a RESTful API, and the specification is composed primarily of a list of endpoints or URLs where the marketplace platform system should communicate events, e.g. user trying to sign on, a company is purchasing your product, etc. The parameters and security associated with the endpoints are defined by documentation and convention of the marketplace platform system. In one embodiment, the integration specification is comprised of the endpoint URLs specified by the AppDirect Event API provided by AppDirect, Inc., available at info.appdirect.com. In other embodiments, the specification corresponds to providing URLs for calls according to an API defined in WADL or JSON schema.

The main components of the integration specification according to one embodiment are: sign-on, subscriptions, add-ons, access management, and communication channel security ("OAuth Configuration" on FIG. 8). Each will be discussed in turn; the view of FIG. 8 omits the specific entry field examples for some aspects, shown as dotted ovals to convey the broader concept.

Starting at the top, the sign-on capability portion of the integration specification provides a mechanism for the marketplace platform system to allow users to sign on to the application. Not every application requires sign-on capabilities, e.g. single-user applications and/or downloadable applications. In this embodiment, the Open ID protocol is used, and so in addition to a URL, the developer can specify an Open ID realm parameter to be used as well. Using this approach allows the developer to rely on the marketplace platform system for authentication of users, thus trivially allowing developers to support single sign-on.

The next component is subscriptions. An endpoint for subscription creation is provided (SUBSCRIPTION_ORDER) together with the ability for the developer to indicate some options, e.g. interactivity (the marketplace platform system should allow purchasers to visit the application to configure certain settings) and domain registration (the purchaser needs to provide a domain, e.g. mydomain.com with the order; this can be prompted for during the order process of step 430). Additional subscription-related endpoints 820 are not shown, e.g. SUBSCRIPTION_CHANGE, SUBSCRIPTION_CANCEL, SUBSCRIPTION_NOTICE for pricing changes, cancellations, and overdue/delinquent accounts, respectively.

On this screen, the UI for defining the integration specification for add-ons is next. The add-ons have a similar set of endpoints including additional add-on endpoints 822: ADDON_ORDER, ADDON_CHANGE, and ADDON_CANCEL. For example, an add-on could be extra storage space or professional services, e.g. 5 GB/month. Add-ons are notable in that they can be automatically co-terminated when a subscription ends.

Next on FIG. 8 is the interface for user access management. As shown, there are two endpoints provided, one for user assignment and one for user unassignment. Additionally, the developer is allowed to request additional information from the marketplace platform system 120 about the (assigned) users, where the information is available: job title, department, ZIP code, billing rate, time zone, application administrator status, view/edit rights, username, and an identification number, (primary) group, all groups. Not all of these fields will necessarily be available for all users in all companies. Some of the fields may be defined solely within the user interface of the marketplace platform system, e.g. application administrator status. Thus, if a customer of Jane's Expense Application product has a new head of finance, the developer no longer has to build custom interfaces for re-allocating the administrator or field support calls; the access management portion of the integration specification builds in a ready mechanism for direct support of changing administrators into the application. Similarly, application developers can benefit from the import of information, e.g. departments or groups, so that hierarchical information that the company defines in a single place flows directly into the application.

Also, the integration specification includes communication channel security information. In this embodiment, no information is needed because OAuth is used and the marketplace platform system provides the key and secret. The developer, however, can use the new secret 824 button to regenerate the secret. Other embodiments may make use of client certificates or other information that is uploaded/provided to the marketplace platform system to secure event communications between the platform and the application-defined endpoints. Thus, in this embodiment, the communication channel security information is empty.

When the developer is satisfied with the integration specification, she can use the save 810 button to record. As discussed in connection with FIG. 5, in this embodiment, once an application is published, further changes to the integration specification do not take effect until republication occurs.

Continuing to FIG. 9, the manage edition 900 screen is shown. Rather than clutter the discussion with the wide array of pricing options available, the FIG. 9 depiction is highly stylized: several significant areas are shown with dotted-ovals to signify functionality. The developer can edit the pricing and finally use the define 950 button to save the pricing. As discussed, in some embodiments at least one pricing model (or edition) is required to publish an application. Additionally, the pricing model may have been automatically created, e.g. based on developer inputs to FIG. 6.

In FIG. 9, the capability to give the pricing models a position (relative in the list to other models), a name, and an optional code are shown. Additional placement options are available, e.g. is this the default pricing, is this the default free-trial, is this pricing model only applicable to a bundle. Similarly, the revenue model can be defined; here a recurring subscription option was chosen.

Notably, within pricing, the two main components are rules for free trial 910, e.g. # days free, # days grace. Developers do not need to offer free trials or a grace period. Further, the semantics of the grace period are developer-defined, e.g. hold account data for that period but no access, allow more limited access, etc. The second big area is the definition of the recurring price 920, e.g. periodicity (month, day, week), price per unit (multi-currency support), units (users, data transferred, custom-defined units), metering options (charge per unit, e.g. gigabyte of data transfer), as well as any bundled options (includes a bundle of X gigabytes), contract (term length, early termination fees, grace periods, automatic renewal). The interface for one-time fees is not shown, but can have similar ranges of options.

The other notable aspect of FIG. 9 is that there is support for additional marketing profile information specific to the edition, marketing resources 930. This includes bullet points to sell the edition, mouseover content, images, hyperlinks, and other resources that are targeted at this pricing model (or edition).

Thus, in discussing FIGS. 6-9 the basic flow for a developer in defining and configuring their application on the marketplace platform system has been discussed. If the developer completed all of this information plus the general marketing profile information, then the dashboard of FIG. 7 would have full progress gauges.

Figure 11:
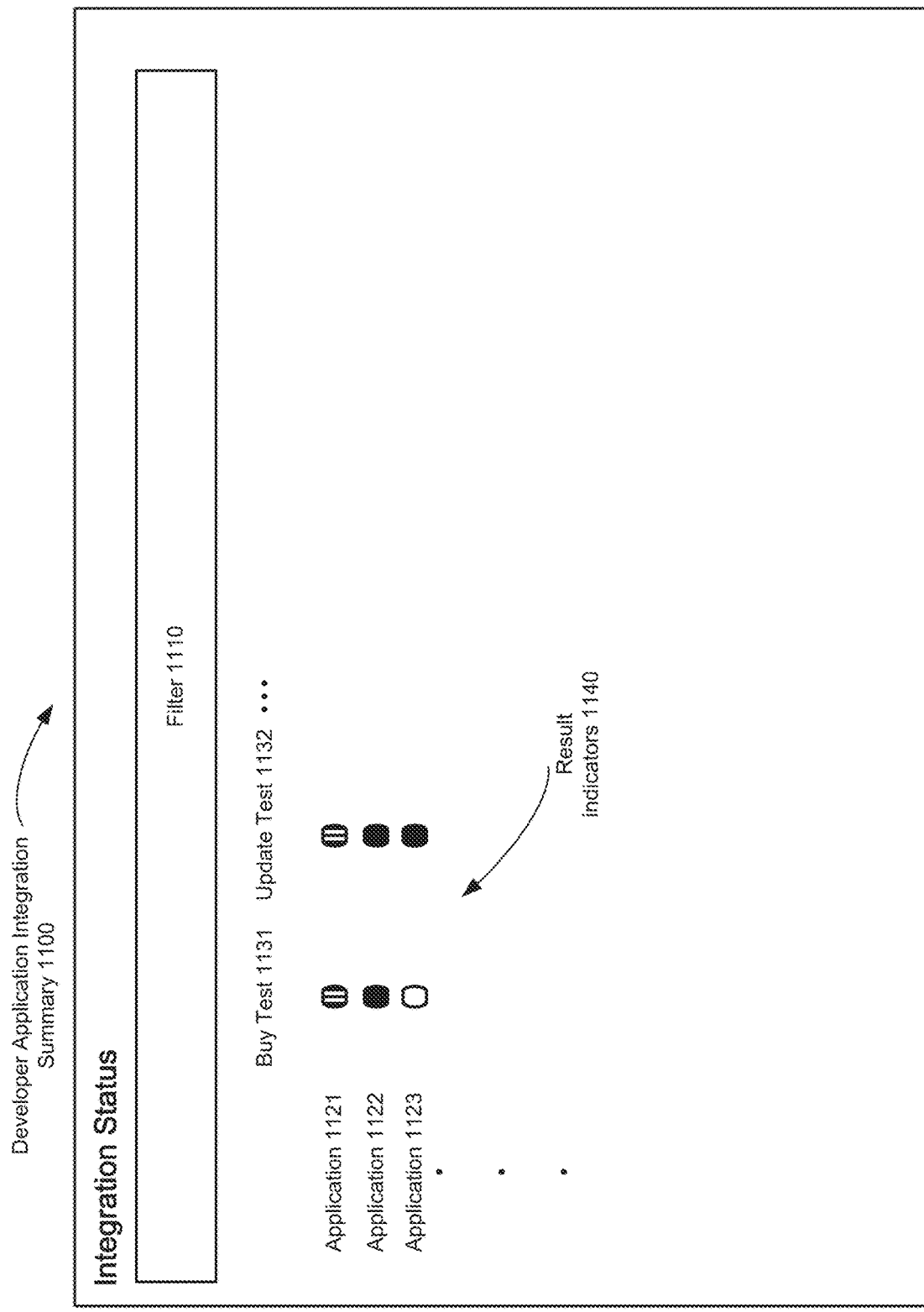
FIG. 11 shows a developer application integration summary.

That said, as noted, publication often requires passing integration specification testing, e.g. the system generating test events to the application. FIGS. 10-11 are relevant to this. Starting with FIG. 10, which shows a developer report for viewing integration events occurring on the marketplace platform, the integration events 1000 screen can be an interactive, or live, report of events in the developer's application. Filtering and selection of fields to display can be effected via filters and fields 1010 controls. Events are shown in a table view in this embodiment with two events: event 1020 and event 1030 highlighted.

FIG. 10 is highly significant for a developer because it means that there is a single place for the developer to view the canonical list of subscriptions, user assignments and the like for her application. This also means that instead of having to debug issues in both the custom interface for handling subscriptions and a marketplace interface, support for the integration specification allows the developer to debug from a single canonical view of who has subscriptions and entitlements to her application. For example, event 1020 a SUBSCRIPTION_CHANGE may have come from marketplace 132, while event 1030 a SUBSCRIPTION_CHANGE may have come directly from the developer site 112. Thus, all of the subscription changes came to the application via a common mechanism and the canonical information, or master, is on the marketplace platform system. As the manually resolved column in FIG. 10 highlights, the marketplace platform system may provide a user interface for developers to review some events and, if necessary, manually correct errors on their system. This supports handling errors by responding to a user with a "pending" response (as opposed to the failure) and then allowing an administrator—marketplace system operators, marketplace operators and/or developers—to review an event queue of the failed events. Each order that failed can then be retried by the administrator. If that still fails, the administrator can contact the developer directly and then if the developer makes corrections in their systems, the administrator can either retry or mark the event as manually resolved. Manually resolved events are then treated by the marketplace system as having returned a success code and the appropriate records are updated. If particular data was needed from the developer, the administrator can be prompted to enter that data manually. This pending-retry/manual resolution mechanism is quite powerful for avoiding lost sales since customers are not turned away at the point of purchase.

The detailed information about specific events is helpful; however, a dashboard such as that shown in FIG. 11 which shows a developer application integration summary 1100 may be more useful. Here again filter 1110 controls can be provided to limit the scope of the report, e.g. only certain applications, certain types of integration tests, certain time frames, etc. The report is shown as a two-dimensional grid with all of the developer's applications on one axis, e.g. applications 1121-1123, and the individual integration event tests on the other axis, e.g. buy test 1131 (aka SUBSCRIPTION_ORDER), update test 1132 (aka SUBSCRIPTION_CHANGE). Result indicators 1140 show the state of the test with different colors, icons, shapes, and/or the like. Here, open, striped, and filled circles are used to signify status with: open=failure; striped=failure in last N hours, but working now; and solid=no issues. Thus, the way to read this report is that application 1121 is currently working, but the integration endpoints have had downtime in the covered period, e.g. within the last 24 hours; application 1122 is working across all integration events; and application 1123 is currently failing the buy test, e.g. SUBSCRIPTION_ORDER.

Because of the distributed way applications are built today, although all of these applications may be on developer site 112, the integration endpoints defined in the integration specification may all point to different servers and/or network infrastructures. Thus, the application 1122 and the application 1123 may be on different servers. Similarly, the endpoints for the different events can be on different servers; therefore, application 1123 may be having an outage for a single function, new orders, but not for changes.

The status dashboard of FIG. 11, together with the more detailed event information of FIG. 10, provides developers a deeper level of insight into the status of their applications. For example, if the marketplace platform system performs ping tests of the integration endpoints regularly, developers can get early warning that purchases on their own site may be failing, together with specific information that may help in troubleshooting the issue. Further, this information crosses the boundary of the direct and indirect sales because the same interface is used for both.

Figure 12:
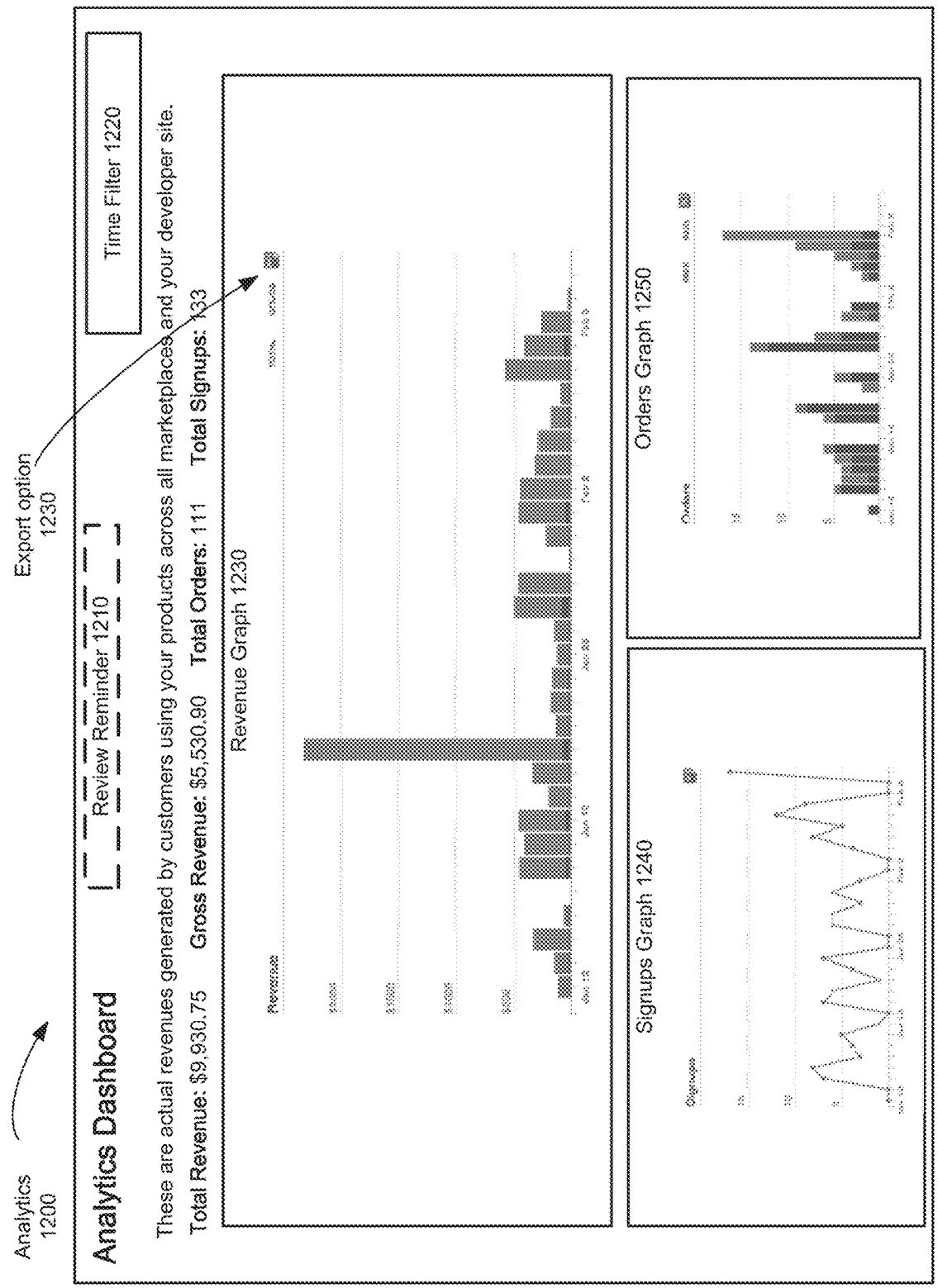
FIG. 12 shows a unified analytics dashboard for application sales across direct and indirect channels.

FIG. 12 shows a unified analytics dashboard for application sales across direct and indirect channels. In one embodiment a distinction is made between several statuses: signup: anyone who put in an email address; activation: anyone who clicked on a confirmation link sent to the signed up email; and order: anyone who placed an order. Notably, with support for SSO, the signup and/or activation steps may happen automatically and/or implicitly. FIG. 12 includes the analytics 1200 screen which provides a unified report for the developer on all of their sales. Thus, both the sales from their own website and from the marketplaces are in one place. Time filter 1220 controls are provided to refine the reporting period and potentially the information and graphs shown. In this embodiment, developers are also provided a chance to see and review reviews of their application, e.g. review reminder 1210. In one embodiment, the developer is prompted to screen reviews made of their application sold via their own website. The review interface is a part of the marketplace implementation 175 that the developer can expose on the developer site 112 and within the application 113. In this embodiment, the developer can screen the reviews, e.g. prevent publication of reviews that do not meet certain criteria. In other embodiments, the developer may also be seeing—and provided an opportunity to respond to—reviews from the marketplaces as well. The degree to which reviews can cross distribution boundaries can be configured according to one embodiment by the channel administrator 306 role.

Returning to the analytics 1200 screen, at the top of the screen brief summaries of the graphs are provided. Here, three visualizations are provided together with options to export (export option 1230) the data to common spreadsheet formats such as Microsoft Excel. The three visualizations are: the revenue graph 1230, showing the revenue per day across marketplaces and the developer site; the signups graph 1240, showing daily signups across marketplaces and the developer site; and the orders graph 1250, showing the daily orders across marketplaces and the developer site. As stated, the key point is that the developer is able to see the different sales all at once, in real time, this may better highlight the impact of marketing dollar spend per channel as well as direct. Further, because data about any sales and discounting is available questions about whether success or failure are connected to marketing campaign can be easily answered. Additionally, the dashboard is sensitive to the margins in each channel plus the developer site allowing measurements and reporting across each.

So far, the focus of this discussion has been on the integration events that go from the marketplace platform system to applications. The API also provides a mechanism for applications to provide information to the marketplace platform system, predefined end points on the marketplace platform. These marketplace platform system endpoints can track usage-based billing events as well as within application activities and logs. For example, applications could send logging events to the marketplace platform for certain application-defined events, e.g. project created, expense reports submitted, etc. This, in turn, will allow the system administrator for the company and/or other users within the company to see that activity via the marketplace platform system.

CONCLUSION AND ADDITIONAL EMBODIMENTS

We described a system and various embodiments for providing both indirect and direct delivery of applications through a marketplace platform. As discussed, this provides for easy deployment by developers of their applications, both through direct sales and indirect sales, using a common API which, in turn, reduces programming needs.

Some additional embodiments and features include:

A single platform that provides four services at once: service billing, identity, data management, and discovery.

A developer center for a developer to manage the life cycle of an application, including: suspending, monitoring, and controlling applications individually.

A mechanism for marketplaces and developer sites to easily bundle multiple applications into a bundle for sale to customers.

A two-key, or dual, approval system for application publication and republication workflow across direct and indirect channels.

A single dashboard for application sales data across multiple separate indirect marketplaces as well as direct sales.

From a marketplace, the ability to view the status of all applications from multiple developers (analagous to view of FIG. 11 but from a marketplace perspective for applications launched on their marketplace). May also offer the ability to suspend and control individual applications, e.g. temporarily disable signups, hide an application from new purchases, completely remove, etc.

As discussed reviews can cross marketplaces and developer sites. Some marketplaces may prefer that reviews only be made by their direct customers, e.g. Marketplace X may prefer to only have reviews by other Marketplace X customers. However, the ability to see all of the reviews from all of the marketplaces in one place and, depending on the location, either control visibility and/or respond is powerful for developers.

Some embodiments may include a recommendation engine that suggests applications to users based on behaviors of all customers across marketplaces and developer sites. This means that the behavior of users on the developer site can drive recommendations on Marketplace X; similarly, user behaviors on Marketplace X can drive recommendations on Marketplace Y.

Federation of identity can be supported to secondary services; for example, if a marketplace or company has an existing single sign-on or identity solution, that can be federated into purchased applications.

Some embodiments copy the organization structure from a single sign-on solution into applications. This allows organizational structure information, sometimes expressed as groups, to copy into newly purchased applications easily. For example, when a company purchases new applications for all (or a group of) users, they may prefer that entitlements be activated within the applications accordingly.

Bootstrapping SMEs. Consider a brand new SME that wants to purchase an email solution; the marketplace platform system can bootstrap the purchase of services like Google Apps/Microsoft Live for that company, even though there is not an existing set of users@company.com addresses. In one embodiment, a user the company chooses uses the marketplace platform system to log in with an arbitrary email address and create their domain; from their purchases, the other services in turn selects a domain and creates accounts.

Subscription and/or entitlement transfers can be supported by some embodiments. This can allow a developer to migrate away from their existing custom code for natively handling the equivalent of integration events and UIs toward the UI provided by the marketplace platform system.

Some embodiments can handle the transfer of subscriptions and/or entitlements from one marketplace to another, e.g. if a marketplace is closed or merges with another marketplace. Some embodiments may also facilitate the transfer of subscriptions and/or entitlements from a marketplace to a developer site. These transfers can all be effectuated without changing the relationship between the users/companies and the applications. However, these changes generally do not change the price charged to the user, but might change the allocation of revenue between the marketplace platform operator, the marketplace operator, and the developer and/or whether bills from multiple developers are unified for the company.

Some embodiments may include mechanisms for applications to indicate additional data such as roles and/or responsibility assignments that the marketplace platform system should expose to system administrators. For example, some applications may wish to enforce a geographic restriction on usage. Thus, a user geography may be required. In some embodiments, the integration specification includes support for custom, application-defined fields. Similarly, some applications may have a mixture of roles that users can be assigned; thus, similar embodiments could include support in the integration specification to allow applications to define such custom fields for the marketplace platform system to, in turn, expose in the user assignment UI, e.g. as users are assigned/unassigned, the necessary custom fields can be assigned.

Some embodiments include support for desktop and mobile launcher applications. In some embodiments, launchers are created that launch a site-specific web browser. Such applications may, depending on the developer site (or marketplace) configuration, pre-sign you in. For example, you could imagine for Mac OS X users an "Expense Application" icon being added to the appropriate Application folder that pre-signs in StartCo customers to the website. Alternatively, the launcher application may be the application 113 itself. In either version, the application could also prompt users to sign in using the marketplace platform system.

Some embodiments may involve purchases of complex systems configurations and services. For example, a company could purchase a Rackspace, VMWare or Amazon AWS configuration of instances/virtual machines for a compute purpose. Thus, the developer site 112 is selling as an application 113 the service of a preconfigured (complex) compute environment. In still other embodiments, the delivered configuration may be privately installed on the user's own computing resources based on the single order via the marketplace platform system.

Some embodiments may include contract management between developers and marketplaces. The publication discussion of FIG. 5 did not directly address the legal/contractual relationships among the developers, marketplace operators, and/or marketplace platform operator. In some embodiments, the marketplace platform system facilitates electronic contracting between the parties via a workflow process and/or default forms of agreement.

Some embodiments allow an individual to self-service create a marketplace through a form-driven process that allows them to define their marketplace and customize the branding for the marketplace.

Any data structures and code described or referenced above are stored according to many embodiments on a computer-readable storage medium, which may be any device or medium that can store code and/or data for use by a computer system. This includes, but is not limited to, volatile memory, non-volatile memory, application-specific integrated circuits (ASICs), field-programmable gate arrays (FPGAs), magnetic and optical storage devices such as disk drives, magnetic tape, CDs (compact discs), DVDs (digital versatile discs or digital video discs), or other media capable of storing computer-readable media now known or later developed.

The preceding description is presented to enable the making and use of the invention. Various modifications to the disclosed embodiments will be apparent, and the general principles defined herein may be applied to other embodiments and applications without departing from the spirit and scope of the invention. Thus, the invention is not intended to be limited to the embodiments shown, but is to be accorded the widest scope consistent with the principles and features disclosed herein. The scope of the invention is defined by the appended claims.

We claim:

1. A system comprising:
   a plurality of marketplaces, each marketplace in the plurality of marketplaces:
      listing a plurality of applications for license, the plurality of applications including a developer application;
      allowing a first plurality of entities to purchase a first plurality of licenses to the plurality of applications; and
      providing for entities in the first plurality of entities to manage user entitlements to the first plurality of licenses;
   a developer site, the developer site providing:
      the developer application;
      allowing a second plurality of entities to purchase a second plurality of licenses to the developer application; and
      providing for entities in the second plurality of entities to manage user entitlements to the second plurality of licenses; and
   a marketplace platform, the marketplace platform using a single application programmer interface (API) for:
      allowing the first plurality of licenses and the second plurality of licenses to the developer application to be purchased through both the plurality of marketplaces and the developer site, respectively, and managing user entitlements for both the plurality of marketplaces and the developer site.

2. The system of claim 1, wherein:
   the first plurality of entities comprises a first entity; the second plurality of entities comprises the first entity;

a first marketplace in the plurality of marketplaces sells, to the first entity, a first license to a second application distinct from the developer application; and the developer site sells, to the first entity, a second license to the developer application.

3. The system of claim 1, wherein:

a first marketplace in the plurality of marketplaces sells, to a first entity in the first plurality of entities, a first license to the developer application;

the developer site sells, to a second entity in the second plurality of entities, a second license to the developer application;

use of the developer application by the first entity and the second entity occurs via the developer site; and the marketplace platform provides a single API for:
responding to a first access request from the first entity to access the developer application with a first authorization to the developer site; and
responding to a second access request from the second entity to access the developer application with a second authorization to the developer site.

4. The system of claim 1, wherein:

the marketplace platform generates a report comprising unified data on license purchases across the plurality of marketplaces and the developer site.

5. The system of claim 1, wherein:

the marketplace platform maintains a master record of all licenses to the developer application.

6. The system of claim 1, wherein:

the developer application does not include an interface for modifying user entitlements.

7. The system of claim 1, wherein:

the marketplace platform provides a single interface for modifying user entitlements across both the plurality of marketplaces and the developer site.

8. The system of claim 1, wherein the marketplace platform further provides service billing, identity management, data management, and application discovery.

9. The system of claim 1, wherein the marketplace platform further provides a developer center that allows a developer of the developer application to manage a life cycle of the developer application.

10. The system of claim 9, wherein the managing of the life cycle of the developer application via the developer center comprises an ability to suspend, monitor, and control the developer application.

11. A method comprising:

providing a plurality of marketplaces, each marketplace in the plurality of marketplaces:
listing a plurality of applications for license, the plurality of applications including a developer application;
allowing a first plurality of entities to purchase a first plurality of licenses to the plurality of applications; and
providing for entities in the first plurality of entities to manage user entitlements to the first plurality of licenses;

providing a developer site, the developer site providing:
the developer application;
allowing a second plurality of entities to purchase a second plurality of licenses to the developer application; and
providing for entities in the second plurality of entities to manage user entitlements to the second plurality of licenses; and providing a marketplace platform, the marketplace platform using a single application programmer interface (API) for:
allowing the first plurality of licenses and the second plurality of licenses to the developer application to be purchased through both the plurality of marketplaces and the developer site, respectively, and managing user entitlements for both the plurality of marketplaces and the developer site.

12. The method of claim 11, wherein:

the first plurality of entities comprises a first entity; the second plurality of entities comprises the first entity;

a first marketplace in the plurality of marketplaces sells, to the first entity, a first license to a second application distinct from the developer application; and the developer site sells, to the first entity, a second license to the developer application.

13. The method of claim 11, wherein:

a first marketplace in the plurality of marketplaces sells, to a first entity in the first plurality of entities, a first license to the developer application; the developer site sells, to a second entity in the second plurality of entities, a second license to the developer application; use of the developer application by the first entity and the second entity occurs via the developer site; and the marketplace platform provides a single API for:
responding to a first access request from the first entity to access the developer application with a first authorization to the developer site; and
responding to a second access request from the second entity to access the developer application with a second authorization to the developer site.

14. The method of claim 11, wherein:

the marketplace platform generates a report comprising unified data on license purchases across the plurality of marketplaces and the developer site.

15. The method of claim 11, wherein:

the marketplace platform maintains a master record of all licenses to the developer application.

16. The method of claim 11, wherein:

the developer application does not include an interface for modifying user entitlements.

17. The method of claim 11, wherein:

the marketplace platform provides a single interface for modifying user entitlements across both the plurality of marketplaces and the developer site.

18. The method of claim 11, wherein the marketplace platform further provides service billing, identity management, data management, and application discovery.

19. The method of claim 11, wherein the marketplace platform further provides a developer center that allows a developer of the developer application to manage a life cycle of the developer application.

20. A non-transitory machine-readable medium that stores instructions that, when executed by one or more processors, cause the one or more processors to perform operations comprising:

providing a plurality of marketplaces, each marketplace in the plurality of marketplaces:
listing a plurality of applications for license, the plurality of applications including a developer application;
allowing a first plurality of entities to purchase a first plurality of licenses to the plurality of applications; and providing for entities in the first plurality of entities to manage user entitlements to the first plurality of licenses;

providing a developer site, the developer site providing:
the developer application;
allowing a second plurality of entities to purchase a second plurality of licenses to the developer application; and
providing for entities in the second plurality of entities to manage user entitlements to the second plurality of licenses; and providing a marketplace platform, the marketplace platform using a single application programmer interface (API) for:
allowing the first plurality of licenses and the second plurality of licenses to the developer application to be purchased through both the plurality of marketplaces and the developer site, respectively, and managing user entitlements for both the plurality of marketplaces and the developer site.

\* \* \* \* \*